United States Patent [19]

Shaikh et al.

[11] 4,138,455

[45] Feb. 6, 1979

[54] METHOD FOR PREPARING DENSE, BETA-ALUMINA CERAMIC BODIES BY LIQUID PHASE SINTERING

[75] Inventors: Mohammed N. Shaikh, Salt Lake City; Ivan B. Cutler, Centerville; Anil V. Virkar; Ronald S. Gordon, both of Salt Lake City, all of Utah

[73] Assignee: University of Utah, Salt Lake City, Utah

[21] Appl. No.: 787,821

[22] Filed: Apr. 15, 1977

Related U.S. Application Data

[63] Continuation-in-part of Ser. No. 658,206, Feb. 17, 1976, abandoned, which is a continuation-in-part of Ser. No. 600,236, Jul. 30, 1975, abandoned.

[51] Int. Cl.$^2$ .............................................. C04B 35/10
[52] U.S. Cl. ..................................... 264/56; 264/104; 429/193
[58] Field of Search ......................... 264/66, 104, 56; 429/191, 193

[56] References Cited

U.S. PATENT DOCUMENTS

| | | | |
|---|---|---|---|
| 3,765,915 | 10/1973 | Duncan et al. | 429/193 |
| 3,895,963 | 7/1975 | McGowan et al. | 429/193 |
| 3,903,225 | 9/1975 | Jones et al. | 264/61 |
| 3,959,022 | 5/1976 | DeJonghe et al. | 264/66 |

*Primary Examiner*—Robert F. White
*Assistant Examiner*—John A. Parrish
*Attorney, Agent, or Firm*—Criddle, Thorpe & Western

[57] ABSTRACT

A method is disclosed for preparing a dense, B''-alumina-containing ceramic body exhibiting an electrical resistivity for sodium ion conduction at 300° C. between about 3 and about 20 ohm-cm, by sintering a green ceramic body formed from a composition comprising at least about 90 weight percent of aluminum oxide, about 8.7 to 9.4 weight percent of sodium oxide, about 0.7–0.9 weight percent of lithium oxide, and from 0.0 to about 4.0 weight percent of magnesium oxide at a temperature between about 1400° C. and about 1600° C., for between about three (3) minutes and about 180 minutes to obtain a body containing both B and B''-alumina crystalline forms. The sintered body exhibits a density greater than 90% of theoretical for polycrystalline B''-alumina and a uniform grain size between about 20 and 100 micrometers. All of these compositions were prepared by using either a binary liquid forming mixture between sodium aluminate (NaAlO$_2$) and lithium aluminate (LiAlO$_2$), a ternary liquid forming mixture between sodium aluminate, lithium aluminate and B''-Al$_2$O$_3$, or a ternary liquid forming ingredient between magnesium aluminate (MgAl$_2$O$_4$), sodium aluminate and lithium aluminate, in combination with different alpha alumina powders with a range of crystallite sizes (0.3 – 5 micrometer). Depending on the state of aggregation of and the preparative technique for the liquid forming mixtures and the particle size and distribution of the alumina, resistivities (at 300° C.) after sintering varied between extremes of 18–20 ohm-cm on the high side and 3–5 ohm-cm on the low side. Conditions which maximize the sintered density and minimize the resistivity for the lowest possible temperature are those preparations consisting of a fine binary or ternary liquid forming ingredient mixed with a calcined Na$_2$CO$_3$-Al$_2$O$_3$ mixture. Attainment of these properties is enhanced with the use of an alpha-Al$_2$O$_3$ with a wide particle size distribution (i.e., a size range of 0.3 to 6 micrometers) and an average particle size of about 5 micrometers. These low temperatures of sintering simultaneously help curtail the evaporation of soda and make an open air sintering process feasible.

18 Claims, No Drawings

METHOD FOR PREPARING DENSE, BETA-ALUMINA CERAMIC BODIES BY LIQUID PHASE SINTERING

The U.S. Government has rights in this invention pursuant to Contract C-805 awarded by the National Science Foundation.

This application is a Continuation-in-part of U.S. patent application Ser. No. 658,206 filed Feb. 17, 1976, now abandoned, which a Continuation-in-part of U.S. patent application Ser. No. 600,236, filed July 30, 1975 and now abandoned.

This application relates to a method for preparing dense, strong, B"-alumina containing ceramic bodies having a low electrical resistivity for sodium ion conduction. More particularly, this application relates to a method for preparing polycrystalline B"-alumina-containing bodies which are ideally suited for use as reaction zone separators or solid electrolytes in certain electrical conversion devices.

Among the polycrystalline bi- or multi-metal oxides which are most useful for use in electrical conversion devices, particularly those employing molten metal and/or molten metal salts as reactants, are those in the family of beta-aluminas, all of which exhibit a generic crystalline structure which is readily identifiable by x-ray diffraction. Thus, beta-type alumina or sodium beta-type alumina is a material which may be thought of as a series of layers of aluminum oxide ($Al_2O_3$) held apart by columns of linear Al-O bond chains with sodium ions occupying sites between the aforementioned layers and columns. Numerous beta-type alumina polycrystalline materials exhibiting this generic crystalline structure are disclosed in the following U.S. Patents, the disclosures of which are incorporated herein by reference: U.S. Pat. Nos. 3,404,035; 3,404,036; 3,413,150; 3,446,667; 3,458,356; 3,468,709; 3,468,719; 3,475,220; 3,475,223; 3,475,225; 3,535,163; 3,719,531; and 3,811,943.

Among the numerous polycrystalline beta-type alumina materials disclosed in these patents and which may be processed in accordance with the methods of this invention are those which are modified by the addition of a minor proportion by weight of metal ions having a valence not greater than two (2) such that the modified beta-type alumina composition comprises a major proportion by weight of ions of aluminum and oxygen and a minor proportion by weight of metal ions in crystal lattice combination along with cations which migrate in relation to the crystal lattice as a result of an electric field, the preferred embodiment being wherein the metal ion, having a valence not greater than two (2), is either lithium or a combination of lithium and magnesium. These metals may be included in the composition in the form of lithium oxide or mixtures of magnesium oxide and lithium oxide in amounts ranging from about 0.1 to about 5 weight-percent, preferably from about 0.1 to about 1.5 weight-percent. This type of modified beta-type alumina is more thoroughly discussed in U.S. Pat. Nos. 3,475,255, and 3,535,163, mentioned above. Such lithia and magnesia-stabilized beta-alumina are preferred compositions for the preparation of beta-type alumina bodies demonstrating the B" crystal structure.

The energy conversion devices for which the dense polycrystalline B"-alumina containing bodies of this invention are particularly useful as reaction zone separators or solid electrolytes are disclosed in some detail in the aforementioned patents. In the operation of such energy conversion devices, the cations such as sodium in the B"-alumina migrate in relation to the crystal lattice as a result of effects caused by an electric field. Thus, the solid ceramic electrolyte made by the process of this invention is particularly suited since it provides selective cationic communication between the anodic and cathodic reaction zones of the energy conversion devices and is essentially impermeable to the fluid reactants employed in the device when the reactants are in the elemental, compound or anionic state. Among the energy conversion devices in which the particular polycrystalline B"-alumina containing ceramics are useful are:

(1) primary batteries employing electrochemically reactive oxidants and reductants in contact with and on opposite sides of the solid electrolyte or reaction zone separator;

(2) secondary batteries employing molten, electrochemically reversably reactive oxidants and reductants in contact with and on opposite sides of the solid electrolyte or reaction zone separator;

(3) thermoelectric generators wherein a temperature and pressure differential is maintained between anodic and cathodic reaction zones and/or between anode and cathode and a molten alkaline metal which is converted to ionic form, passed through the polycrystalline B"-alumina containing ceramic wall or inorganic membrane and reconverted to elemental form; and (4) thermally regenerated fuel cells.

A review of the operation of such electrical conversion devices as disclosed in the aforementioned patents and detailed at length in the literature should make it clear that the conductive ceramic material employed in the preparation of these devices should have a low resistivity, preferably from about 3 to about 6 ohm-cm, and a strength as high as possible, preferably from about 20,000 psi to about 50,000 psi. Prior art techniques for the preparation of conductive beta-type alumina ceramic either produce materials of high strength and high resistivity or materials of low strength and low resistivity, depending upon the time and temperature of sintering. Those bodies which have been sintered at higher temperatures and for longer periods of time in order to lower the resistivities often tend to exhibit a duplex grain structure with grains ranging up to 150 micrometers or more in size. Such a duplex grain structure has a deleterious effect on fracture strength, elastic modulus and fracture toughness of the sintered body. Those bodies which have been sintered at lower temperatures or for lower periods of time, on the other hand, while demonstrating a small grain size which is desirable for maintaining the strength of the body, do not exhibit the low resistivity which is desired, presumably because substantial amounts of B-alumina remain unconverted to the B" crystalline form.

Recently, however, a two-step process has been developed in which the ceramic is sintered at temperatures between 1500° and 1650° C. for times between about 1 and 60 minutes after which the sintered body is exposed to a heat soak at temperatures between about 1300° and 1500° C. for times between 1 and 40 hours. Polycrystalline B"-$Al_2O_3$ bodies formed in accordance with this procedure possess high density, low porosity, high strength and low electrical resistivity. The high strength (over 20,000 psi) is due probably to the small grain size and low porosity while the low resistivity (less than 8 ohm-cm at 300° C.) is due to the nearly complete conversion to B"-Al$_2$O$_3$ which is accomplished during the post-sintering anneal.

The method disclosed and claimed in this application for preparing dense, polycrystalline lithia-stabilized and lithia-magnesia-stabilized B"-alumina ceramics exhibiting low resistivities obviates the deficiencies of prior art techniques in several ways:

(1) With the use of pre-reacted liquid forming mixtures and a-Al$_2$O$_3$ powders, with the proper size distributions, sintered densities over 95% of theoretical can be achieved at temperatures about 1450° C., thereby reducing significantly the problem of Na$_2$O evaporation during an open-air sintering process.

(2) Under certain well-defined conditions, resistivities at 300° C. under about 8 ohm-cm and preferably under 5 ohm-cm can be achieved at a low temperature of sintering without the necessity for a post-sintering heat soak. These ceramics in addition to their low resistivity possess a uniform, small grain size microstructure which should make them reasonably strong.

BRIEF DESCRIPTION OF THE INVENTION

Briefly, the invention consists of two essential steps, both of which relate to the nature of the starting ingredients. First, pre-reacted binary (NaAlO$_2$ — LiAlO$_2$) and ternary (NaAlO$_2$ — LiAlO$_2$ — B"-Al$_2$O$_3$), and ternary (NaAlO$_2$ — LiAlO$_2$ — MgAl$_2$O$_4$) liquid forming mixtures are required in the green body so that upon rapid heating to the sintering temperature, transient liquids are formed which promote densification at lower temperatures. Secondly, the particle size distribution of the a-Al$_2$O$_3$ powder must be in a certain range (approximately 0.3–5 micrometers) so that the residence time of the transient liquid is maximized. This alpha alumina can be in unreacted form or precalcined with the appropriate amount of Na$_2$CO$_3$ to form a mixture of B-Al$_2$O$_3$, B"-Al$_2$O$_3$ and NaAlO$_2$.

The various embodiments of the method of this invention will be more fully understood from the detailed description of the invention which follows:

DETAILED DESCRIPTION OF THE INVENTION

Due to the ease in which ideomorphic grains grow in polycrystalline B"-Al$_2$O$_3$ structures it has been speculated for some time that a liquid phase (probably transient) plays an important role in the sintering of lithia-stabilized B"-Al$_2$O$_3$ ceramics. From the work conducted to date (Refer to Annual Reports for periods June 30, 1973-June 29, 1974, and June 30, 1974-June 29, 1975, issued respectively in July 1974 and July 31, 1975 by the National Science Foundation under Contract NSF C-805) on the effect of heating rate on the sintering kinetics, it is quite likely that transient liquids form in the Li$_2$O - Na$_2$O - Al$_2$O$_3$ ternary system during sintering. An x-ray study of calcined powder mixtures of LiNO$_3$, Na$_2$CO$_3$ and Al$_2$O$_3$ at 1250° C. having an overall composition of 8.7% Na$_2$O, 0.7% Li$_2$O, and 90.6% Al$_2$O$_3$ revealed the presence of the NaAlO$_2$, B-Al$_2$O$_3$ and B"-Al$_2$O$_3$ phases. It is also known from our studies that LiNO$_3$ reacts readily with Al$_2$O$_3$ at 1000° C. to form LiAlO$_2$. A subsequent investigation of phase relations between NaAlO$_2$, LiAlO$_2$ and B"-Al$_2$O$_3$ indicated the presence of a binary eutectic liquid at about 1550° C. between NaAlO$_2$ and LiAlO$_2$ and a ternary eutectic liquid 1460° C. between NaAlO$_2$, LiAlO$_2$ and B"-Al$_2$O$_3$. Also, an inhomogeneous mixing of NaAlO$_2$, LiAlO$_2$ and alpha alumina to give an overall composition of 8.7% Na$_2$O, 0.7% Li$_2$O and 90.6% Al$_2$O$_3$, revealed the presence of glassy spots on the sample surface after sintering at 1410° C. Thus transient liquid formation during sintering appears to be a reasonable possibility and the formation of this transient liquid may then be responsible for the lower sintering temperatures (1520°–1550° C.) which have been observed in rapidly-heated powder compacts in our studies on the NSF-sponsored program, supra.

A liquid phase was also observed in the ternary phase field comprised at MgAl$_2$O$_4$—NaAlO$_2$—LiAlO$_2$. This liquid can be similarly used as a transient liquid and to facilitate the sintering of MgO-Li$_2$O stabilized B"-alumina.

It is the purpose of this invention to describe several methods by which these eutectic liquids can be used effectively in promoting densification at very low temperatures (about 1450° C.). In addition to the formation of eutectic liquids, it will become clear that other factors such as the particle size of the starting alpha Al$_2$O$_3$ powder and the distribution of sodium oxide in the powder compact are also important in enhancing the effectiveness of the liquids in promoting low-temperature densification and conversion to B"-Al$_2$O$_3$.

It is well known from the theory of liquid phase sintering that most of the densification takes place due to the macroscopic rearrangement of particles. Hence the particle size and particle size distribution are important parameters to achieve high densities in such systems. Also, in a transient liquid phase sintering system the chemical reactivity of the particles is very important. Alumina powders are desired with a wide particle size distribution so that good packing properties can be achieved. Furthermore, these powders should not be too fine and reactive in order to prolong the presence of the transient liquid. For this purpose relatively coarse powders such as Alcoa A-15 and A-17 were chosen and compared with a fine Meller deagglomerated powder. A-15 is a powder with a particle size distribution ranging 0.3 micrometers and 6 micrometers and an average particle size of about 5 micrometers, while A-17 is a powder with a larger fraction of the finer sizes but having a similar particle size distribution. Meller on the other hand, is a very fine (0.3 micrometers), reactive, deagglomerated alumina powder. As expected the finer Meller was found to be inferior to A-15 in promoting liquid phase sintering. The use of A-17 resulted in intermediate properties.

The second constituent in the powder compact, the liquid forming mixtures, was made in such a way as to obtain a fine particle size to avoid the formation of any voids which could be left behind after the melting of the liquid forming constituents during sintering.

The third factor which was considered in the preparation of the powder compacts was the distribution of sodium oxide. One way to accomplish this task is to make a fine sodium aluminate powder and mechanically distribute it throughout the compact. However, the chemical distribution attained by calcining a mixture of Na$_2$CO$_3$ and a-Al$_2$O$_3$ at 1250° C. for 4 hours was more attractive and resulted in the formation of B-Al$_2$O$_3$, B"-Al$_2$O$_3$ and NaAlO$_2$ which could be uniformly mixed throughout the powder compact.

Ceramic powder compacts prepared from appropriate mixtures of liquid forming ingredients, a-Al$_2$O$_3$, and Na$_2$CO$_3$ were green formed by isostatic pressing. Sintering was conducted in molybdenum wire-wound furnaces. The furnaces were preheated to the temperature of sintering and the powder compacts encapsulated in platinum or placed in a platinum boat were rapidly inserted in the hot zone. The rapid heating schedule is essential for the spontaneous formation of the melt without any significant reaction with the powder matrix. For the liquid to be effective, it must not react and hence disappear too quickly. In addition to experiments in a batch encapsulated mode, some specimens were sintered by a continuous pass-through technique in an open-air atmosphere.

The microstructure of the sintered compacts, particularly those sintered at low temperatures (about 1450° C.) consisted of uniform sized grains (20–50 micrometers) which appeared as if they had been recrystallized from a liquid. All the grains were of about the same size. It was also noticed that even upon heating for short times at higher temperatures (greater than 1500° C.), these grains did not increase in size significantly. At higher sintering temperatures (approximately 1600° C.) there is an increase in grain size which is accompanied by the formation of a slightly duplex grain structure.

These low temperature experiments with the aid of liquid phases indicate that an unencapsulated sintering technique is quite feasible and that any loss of sodium oxide by evaporation should be very small. It is expected that the features of this invention will be further improved if a more intimate mixing procedure can be devised for intermixing the pre-reacted liquid forming ingredients and the precalcined mixtures of alpha $Al_2O_3$ and $Na_2CO_3$. Improved mixing techniques should permit resistivities (300° C.) under 5 ohm-cm to be achieved in a single stage sintering process at temperatures at about 1450° C.

The following specific examples will more fully illustrate the details of the method of this invention:

EXAMPLE 1

Sodium aluminate and lithium aluminate were prepared by reacting, for 4 hours at 1000° C., one mole of dried sodium carbonate with one mole of dried alpha aluminum oxide and one mole of dried lithium nitrate with one mole of dried alpha aluminum oxide. Eighty-two grams of dried $NaAlO_2$ were mixed with 66 grams of dried $LiAlO_2$ by ball milling for 4 hours using aluminum oxide balls of 98% purity. The milled powder was reacted at 1500° C. for 2 hours, crushed, ball milled for another 4 hours, and then sieved through a 325 mesh screen. Then 73.91 grams of dried Meller alpha alumina were mixed with 19.18 grams of dried $NaAlO_2$ and 6.91 grams of dried binary liquid forming ingredients to form a composition having 8.7% $Na_2O$, 0.7% $Li_2O$, and 90.6% $Al_2O_3$. Powder compacts were pressed from this powder using a rectangular die and then isostatically pressed at 55,000 psi. Samples were sintered at various temperatures. In Table 1, the sintered densities obtained at various temperatures are summarized. Since this method of making the binary liquid forming mixture was not very convenient in that it was difficult to achieve an intimate mixture with the other ingredients, attention was given to the preparation of this mixture in a finer form. However, the date in Table 1 clearly reveal that densities over 90% of theoretical can be achieved at temperatures as low as 1430° C.

TABLE 1

Densities of Compacts Sintered with a $NaAlO_2$-$LiAlO_2$ Binary Liquid Forming Mixture

| Sintering Temperature (°C.) | Sintering Time (minutes) | Density (% theoretical, $\beta''$-$Al_2O_3$) |
|---|---|---|
| 1470 | 5 | 90 |
| 1470 | 10 | 92 |
| 1470 | 20 | 94 |
| 1470 | 30 | 95 |
| 1430 | 20 | 91 |
| 1430 | 30 | 93 |

EXAMPLE 2

Sodium aluminate and lithium aluminate were prepared as in Example 1. This time 41 grams of dried $NaAlO_2$, 26.4 grams of dried $LiAlO_2$ and 10.2 grams of dried alpha $Al_2O_3$ were mixed and calcined at 1500° C. to form the ternary liquid forming material. After calcination, the material was crushed and ball milled and only $-325$ mesh particles were retained for further use.

Subsequently 72.74 grams of dried Meller alpha alumina were mixed with 18.2 grams of dried $NaAlO_2$ and 9.08 grams of dried ternary liquid forming ingredients to form the composition, 8.7% $Na_2O$, 0.7% $Li_2O$ and 90.6% $Al_2O_3$. Powder compacts were pressed from this powder as in Example 1 and were sintered at various temperatures. Sintered densities obtained under these conditions are summarized in Table 2. Again, it is seen that densities over 90% can be achieved at temperatures as low as 1430° C.

TABLE 2.

Densities of Compacts Sintered with a $NaAlO_2$-$LiAlO_2$-$\beta'''$ Ternary Liquid Forming Mixture

| Sintering Temperature (°C.) | Sintering Time (minutes) | Density (% theoretical, $\beta''$-$Al_2O_3$) |
|---|---|---|
| 1470 | 5 | 91 |
| 1470 | 10 | 92 |
| 1470 | 30 | 95 |
| 1430 | 20 | 92 |
| 1430 | 30 | 94 |

EXAMPLE 3

The binary liquid forming mixture was prepared by mixing 74 grams of dried $Li_2CO_3$, 106 grams of dried $Na_2CO_3$ and 204 grams of dried alpha $Al_2O_3$ in a ball mill for 4 hours. The mixture was calcined at 1250° C. for 4 hours. The coarse binary mixture so obtained was ball milled again for 4 hours and then mixed in the same proportion as in Example 1 with dried alpha alumina and dried sodium aluminate. In Table 3 the resistivities and densities on samples sintered at various temperatures using two different sources of alpha alumina (Meller and A-15) are summarized. These results reveal that the highest densities and lowest resistivities are achieved with the coarser A-15 alumina.

TABLE 3.

Properties of $\beta''$-$Al_2O_3$ Sintered with the Aid of a Coarse Binary Powders

| Source of $Al_2O_3$ | Sintering Temperature (°C.) | Sintering Time (min) | Resistivity (ohn-cm, 300° C.) | Density (% theoretical) | Grain Size |
|---|---|---|---|---|---|
| A-15 | 1440 | 20 | 18 | 90 | Very fine |
| Meller | 1440 | 20 | 18–20 | 88 | Very fine |
| A-15 | 1480 | 20 | 16–18 | 94 | 100μm maximum |

TABLE 3.-continued

Properties of $\beta''$-$Al_2O_3$ Sintered with the Aid of a Coarse Binary Powders

| Source of $Al_2O_3$ | Sintering Temperature (°C.) | Sintering Time (min) | Resistivity (ohn-cm, 300° C.) | Density (% theoretical) | Grain Size |
|---|---|---|---|---|---|
| Meller | 1480 | 20 | 16-18 | 91 | 70μm maximum |
| A-15 | 1520 | 20 | 10-12 | 96 | 150μm maximum |
| Meller | 1520 | 20 | 12-14 | 93 | 150μm maximum |
| A-15 | 1550 | 20 | 8-10 | 98 | 150μm maximum |
| Meller | 1550 | 20 | 10-12 | 95 | 150μm maximum |
| A-15 | 1590 | 5 | 5-6 | 99 | 150μm maximum |
| Meller | 1590 | 5 | 6-8 | 96 | 150μm maximum |

EXAMPLE 4

The binary mixture was prepared by mixing 59.2 grams of dried $Li_2CO_3$, 106 grams of dried $Na_2CO_3$, 204 grams of dried alpha alumina, and calcining the mixture at 1250° C. for 4 hours. The coarse binary mixture so obtained was ball-milled for 4 hours and then mixed in the same proportions as in Example 2 with dried alpha aluminum oxide and dried sodium aluminate. In Table 4 the resistivities and densities on samples sintered at various temperatures using two different sources of alpha alumina (Meller and A-15) are summarized. Again, the best results were obtained with the coarser alumina powder. Also, the results reveal that comparable results are achieved with the use of either the ternary or binary mixture.

TABLE 4.

Properties of $\beta''$-$Al_2O_3$ Sintered with the Aid of a Coarse Binary Mixture

| Source of $Al_2O_3$ | Sintering Temperature (°C.) | Sintering Time (min) | Resistivity (ohm-cm-300° C.) | Density (% theoretical) | Grain Size |
|---|---|---|---|---|---|
| A-15 | 1440 | 20 | 18 | 90 | Fine grains |
| Meller | 1440 | 20 | 18-20 | 90 | 60μm maximum |
| A-15 | 1480 | 20 | 16-18 | 94 | 100μm maximum |
| Meller | 1480 | 20 | 16-18 | 93 | 100μm maximum |
| A-15 | 1520 | 20 | 10-12 | 96 | 100μm maximum |
| Meller | 1520 | 20 | 12-14 | 94 | 120μm maximum |
| A-15 | 1550 | 20 | 8-10 | 98 | 100μm maximum |
| Meller | 1550 | 20 | 10-12 | 95 | 200μm maximum |
| A-15 | 1570 | 5 | 5-6 | 99 | 100μm maximum |
| Meller | 1570 | 5 | 6-8 | 96 | 200μm maximum |

EXAMPLE 5

The binary mixture was prepared by mixing 74 grams of dried $Li_2CO_3$, 106 grams of dried $Na_2CO_3$ and 204 grams of dried alpha alumina in a ball mill for 4 hours and then calcining the mixture at 750° C. for 6 hours. The fine binary mixture thus obtained was ball milled again for 4 hours and then mixed in the same proportion as in Example 1 with dried alpha alumina and dried sodium aluminate. In Table 5 the resistivities and densities for specimens sintered at various temperatures using three different sources of alpha alumina (Meller, A-15 and A 17) are summarized. With the use of the fine mixture densities up to 96-97% could be achieved at temperatures between 1400°-1440° C. Resistivities under 10 ohm-cm were achieved in ceramic sintered at temperatures as low as 1440° C.

TABLE 5.

Properties of $\beta''$-$Al_2O_3$ Sintered with the Aid of a Fine Binary Mixture

| Source of $Al_2O_3$ | Sintering Temperature (°C.) | Sintering Time (min) | Resistivity (ohm-cm-300° C.) | Density (% Theoretical) | Grain Size |
|---|---|---|---|---|---|
| A-17 | 1400 | 120 | 16-18 | 94-96 | Less than 25μm |
| A-17 | 1440 | 120 | 8-10 | 96-97 | Less than 40μm |
| A-15 | 1480 | 20 | 8-10 | 95 | 75μm average |
| Meller | 1480 | 20 | 10-12 | 89 | 100μm maximum |
| A-15 | 1500 | 20 | 6-7 | 97 | 100μm maximum |
| Meller | 1500 | 20 | 8-10 | 95 | 100μm maximum |
| A-17 | 1500 | 20 | 8-10 | 96-97 | 80μm maximum |
| A-15 | 1520 | 20 | 5-6 | 98 | 90μm average 120μm maximum |
| Meller | 1520 | 20 | 8-10 | 96 | 100μm maximum |
| A-17 | 1600 | 5 | 6-10 | 97-98 | Less than 100μm |

EXAMPLE 6

The fine binary mixture was prepared in the same manner as in Example 5. Then the three different sources of alpha alumina (A-15, A-17 and Meller) were each calcined with dried $Na_2CO_3$ in the proportion 12.40 grams of $Na_2CO_3$ and 85.84 grams of alumina at 1250° C. for 4 hours to obtain a mixture of B-$Al_2O_3$ and $NaAlO_2$. This calcined mixture was then mixed with 6.41 grams of dried fine binary mixture and then ball milled for 4 hours. In Table 6 the resistivities and densities obtained on these samples after sintering at various temperatures are summarized. These data reveal that high densities and resistivities under 8 ohm-cm can be achieved at sintering temperatures as low as 1440° C. without any post-sintering anneal.

TABLE 6.

Properties of $\beta''$-$Al_2O_3$ Sintered with the Aid of a Fine Binary Liquid Forming Mixture and a $\beta$-$Al_2O_3$ - $NaAlO_2$ Pre-Reacted Mixture

| Source of $Al_2O_3$ | Sintering Temperature (°C.) | Sintering Time (min) | Resistivity (ohm-cm-300° C.) | Density (% theoretical) | Grain Size |
|---|---|---|---|---|---|
| A-15 | 1440 | 120 | 5–8 | 95–96 | Less than 40μm |
| A-17 | 1440 | 120 | 5–8 | 95–96 | Less than 40μm |
| Meller | 1440 | 120 | 5–8 | 94–96 | Less than 70μm |
| A-15 | 1500 | 60 | 5–8 | 96–98 | 70–80μm |
| A-17 | 1500 | 60 | 5–8 | 95–96 | Less than 40μm |
| Meller | 1500 | 60 | 5–8 | 94–96 | Less than 70μm |
| A-15 | 1600 | 5 | 5–8 | 98–99 | Less than 70μm |
| A-17 | 1600 | 5 | 5–8 | 97–98 | Less than 40μm |
| Meller | 1600 | 5 | 5–8 | 97–98 | Less than 120μm |

EXAMPLE 7

The binary liquid forming composition was prepared in the same manner as in Example 4. Two different sources of alpha alumina (Meller and A-15) were each calcined with dried $Na_2CO_3$ in the same manner as in Example 6 to obtain a mixture of B-$Al_2O_3$ and $NaAlO_2$. This calcined mixture was then mixed with 9.08 grams of dried binary liquid forming composition and ball milled for 4 hours. In Table 7 the resistivities and densities obtained on these samples after sintering at various temperatures are summarized.

TABLE 7.

Properties of $\beta''$-$Al_2O_3$ Sintered with the Aid of a Binary Liquid Forming Mixture and a Calcined B+$NaAlO_2$ Mixture

| Source of $Al_2O_3$ | Sintering Temperature (°C.) | Sintering Time (min) | Resistivity (ohm-cm-300° C.) | Density (% theoretical, $\beta''$-$Al_2O_3$) | Grain Size (μm) |
|---|---|---|---|---|---|
| A-15 | 1440 | 120 | 12–16 | 93–95 | 40 |
| Meller | 1440 | 120 | 12–16 | 93 | 70 |
| A-15 | 1500 | 60 | 10–12 | 95 | 40 |
| Meller | 1500 | 60 | 10–12 | 94 | 70 |

EXAMPLE 8

Samples prepared as in Examples 5 and 6 were sintered in a passthrough furnace where the sample was moved through the furnace at rates of 1 inch per minute and 2½ inches per minute. The maximum temperature in the furnace was 1600° C. and the length of hot zone was about 5 inches. In Table 8 the resistivities and densities are summarized for samples sintered in continuous fashion in an open-air atmosphere using Meller, A-15 and A-17 alpha aluminas. Sintering by this technique resulted in dense, fine-grained, and conductive (under 8–10 ohm-cm) ceramics.

TABLE 8.

Properties of $\beta''$-$Al_2O_3$ Made in a Pass-Through Furnace at Various Speeds

| Source of $Al_2O_3$ | Method of Preparation | Pass-Through Velocity (in/min) | Resistivity (ohm-cm-300° C.) | Density (% theoretical, $\beta''$-$Al_2O_3$) | Grain Size (μm) |
|---|---|---|---|---|---|
| A-15 | Fine binary Liquid Forming Mixture + $\alpha$-$Al_2O_3$ + $NaAlO_2$ | 2½ | 8–10 | 97–99 | Less than 40 |
| A-17 | " | 2½ | 8–10 | 97–99 | Less than 25 |
| Meller | " | 2½ | 8–10 | 97–98 | Less than 50 |
| A-15 | " | 1 | 6–8 | 97–99 | Less than 40 |
| A-17 | " | 1 | 6–8 | 97–99 | Less than 40 |
| Meller | " | 1 | 6–8 | 97–98 | Less than 70 |
| A-15 | Fine binary + $\beta$ + $NaAlO_2$ | 1 | 6–8 | 97–99 | Less than 40 |
| A-17 | " | 1 | 6–8 | 97–99 | Less than 40 |
| Meller | " | 1 | 6–8 | 97–98 | Less than 70 |

EXAMPLE 9

Samples prepared as in Examples 5 and 6 were sintered in a furnace maintained at 1400° C. and heated up to 1600° C. in 1 hour and cooled down to 1400° C. in 15 minutes and withdrawn from the furnace. In Table 9 the densities and resistivities obtained by this batch mode of sintering are summarized. It is clear that the use of the coarse powders (A-15 and A-17) leads to the microstructures with the smallest grain size.

TABLE 9.

$\beta''$-Alumina Sintered Between Temperatures of 1400° C. and 1600° C. and Then Cooled to 1400° C. in a Total Time of 75 Minutes

| Source of Alumina | Resistivity (ohm-cm-300° C.) | Density (% theoretical, $\beta''$-$Al_2O_3$) | Grain Size (μm) |
|---|---|---|---|
| A-15 | 5–7 | 96–97 | 50 |
| Meller | 5–7 | 95–96 | 100 |
| A-17 | 5–7 | 96–97 | 40 |

EXAMPLE 10

Samples sintered as in Examples 5 and 6 were annealed at a temperature of 1550° C. for short periods of time. In Table 10 the densities, resistivities, and microstructures of these annealed samples are summarized. From these data it is clear that if for some applications a resistivity (300° C.) below 5 ohm-cm is required, a short time heat soak at 1550° C. is necessary. However, resistivities in the range 5–8 ohm-cm can be achieved in a single stage sintering process provided liquid phases as described in this patent are used as sintering aids.

TABLE 10.

| | Properties of β"-Al₂O₃ Sintered and Annealed with the Aid of a Fine Binary Mixtures | | | | | | |
|---|---|---|---|---|---|---|---|
| | Sintering | | Annealing | | | | Average |
| Method of Preparation | Temp. (° C.) | Time (min) | Temperature (° C.) | Time (min) | Resistivity (ohm-cm-300° C.) | Density (% theoretical, β"-Al₂O₃) | Grain Size (μm) |
| A-15 + binary mixture + NaAlO₂ | 1440 | 120 | 1550 | 20 | 5–6 | 95–96 | 40 |
| Binary mixture + β-Al₂O₃ + NaAlO₂ | 1440 | 120 | 1550 | 20 | 4–6 | 96–97 | 40 |
| Meller + binary mixture + NaAlO₂ | 1500 | 120 | 1550 | 20 | 5–6 | 95–96 | 100 |
| Binary mixture + β-Al₂O₃ + NaAlO₂ | 1500 | 120 | 1550 | 20 | 5–6 | 96–97 | 100 |
| A-15 + binary mixture + NaAlO₂ | 1500 | 20 | 1550 | 20 | 5–6 | 96–97 | 40 |
| β-Al₂O₃ + binary mixture + NaAlO₂ | 1500 | 20 | 1550 | 20 | 4–6 | 96–97 | 40 |

EXAMPLE 11

A ternary composition between $NaAlO_2$, $LiAlO_2$ and $MgAl_2O_4$ was prepared by mixing 61.9 grams of $MgCO_3$, 106 grams of $Na_2CO_3$, 74 grams of $Li_2CO_3$ and 278.6 grams of dried alpha alumina in a ball mill for 4 hours. The mixture was then calcined at 1000° C. for 4 hours. The fine ternary composition thus obtained was milled for 4 hours in a ball mill. 80.91 grams of dried A-15 alpha alumina was mixed with 12.05 grams of dried $Na_2CO_3$ in a ball mill for 4 hours. The mixture was then calcined at 1250° C. for 4 hours, and then ball milled with 12.05 grams of ternary composition prepared as above. In Table 11, densities and resistivities obtained on these samples after sintering at various temperatures are summarized. These data reveal that high densities and resistivities under 4 ohm-cm can be achieved at sintering temperatures as low as 1450° C. without any post sintering anneal. These samples also exhibited a fine (25–40 micrometers) plate-like uniform grain structure as opposed to a lamellar growth frequently obtained in $Li_2O$ stabilized $B''$-$Al_2O_3$.

EXAMPLE 12

A binary mixture between $NaAlO_2$-$MgAl_2O_4$ was prepared by mixing 61.9 grams of $MgCO_3$, 106 grams of $Na_2CO_3$ and 176.6 grams of dried Meller alpha alumina and calcining it at 1250° C. for 4 hours. $Li_2O$:$5Al_2O_3$ was prepared by mixing 69 grams of $LiNO_3$ with 510 grams of alpha alumina in a ball mill for 4 hours and calcining at 1250° C. for 4 hours. 68.67 grams of A-15 alpha alumina was mixed with 12.05 grams of dried $Na_2CO_3$ in a ball mill and the mixture was calcined at 1250° C. for 4 hours. The calcined powder was mixed with 16.2 grams of $Li_2O$:$5Al_2O_3$ and 8.09 grams of binary mixture in a ball mill for 4 hours. Compacts prepared from this powder were sintered at 1600° C. for 5 minutes, to obtain over 96% (of theoretical) density and resistivities between 3.2–3.4 ohm-cm with a grain size between 60 and 100 micrometers.

TABLE 11

| | Properties of Mixed MgO-Li₂O Stabilized β"-alumina | | | |
|---|---|---|---|---|
| No. | Sintering Temperature (° C.) | Sintering time (min) | Resistivity (Ω-cm-300° C.) | Density (% theoretical of β"-Al₂O₃) | Grain Size (μm) |
| 1 | 1440 | 60 | 6.5 | 91 | — |
| 2 | 1440 | 120 | 3.5 | 95.2 | 25–40 |
| 3 | 1440 | 180 | 3.2–3.4 | 95.5 | 25–40 |
| 4 | 1500 | 60 | 6–8 | 95–96 | 60–70 |
| 5 | 1550 | 60 | 6–8 | 95–96 | 60–80 |
| 6 | 1600 | 5 | 6–8 | 95–96 | >25 |

We claim:

1. A method for preparing a dense, lithia stablizied B"-alumina containing ceramic body exhibiting a resistivity to 300° C. of between about 5 and about 20 ohm-cm comprising:
   (A) forming a green ceramic body from a composition comprising:
      (i) a first component comprising a liquid forming composition containing sodium aluminate and lithium aluminate; and
      (ii) a second component comprising (a) alpha-alumina powder having a particle size in the range of about 0.3 to about 5 micrometers or (b) the reaction products formed by calcining said alpha-alumina powder with sodium carbonate, said components being used in such amounts that, after sintering to final density, the stoichiometric composition of the B"-alumina so formed is from about 5 to about 15 weight percent of sodium oxide, about 0.1 to about 5 weight percent of lithium oxide and about 94.9 to about 80 weight percent of aluminum oxide; and
   (B) sintering said green body at a temperature between about 1440° C. to less than 1550° C. and for a time necessary to achieve the desired final density.

2. A method in accordance with claim 1 wherein said liquid forming composition is a binary mixture consisting of sodium aluminate and lithium aluminate in equimolar amounts.

3. A method in accordance with claim 2 wherein said binary mixture is prepared by calcining a mixture of 1 mole of lithium carbonate, 1 mole of sodium carbonate and 2 moles of aluminum oxide.

4. A method in accordance with claim 1 wherein said liquid forming composition is a ternary mixture consisting of sodium aluminate, lithium aluminate and B"-alumina, having 0.4 moles of lithium aluminate, 0.5 moles of sodium aluminate and 0.1 moles of aluminum oxide.

5. A method in accordance with claim 1 wherein said second component comprises a mixture of sodium aluminate and said alpha-alumina having a particle size in the range of about 0.3 to about 5 micrometers.

6. A method in accordance with claim 5 wherein said liquid forming composition comprises a binary mixture consisting of sodium aluminate and lithium aluminate in equimolar amounts.

7. A method in accordance with claim 5 wherein said liquid forming composition comprises a ternary mixture consisting of sodium aluminate, lithium aluminate, and B″-alumina, having 0.4 moles of lithium aluminate, 0.5 moles of sodium aluminate and 0.1 moles of aluminum oxide.

8. A method in accordance with claim 1 wherein said second component comprises said reaction products which consist of B-alumina and sodium aluminate.

9. A method in accordance with claim 8 wherein said liquid forming composition comprises a binary mixture consisting of sodium aluminate and lithium aluminate in equimolar amounts.

10. A method in accordance with claim 8 wherein said liquid forming composition comprises a ternary mixture consisting of sodium aluminate, lithium aluminate and B″-alumina, having 0.4 moles of lithium aluminate, 0.5 moles of sodium aluminate and 0.1 moles of aluminum oxide.

11. A method in accordance with claim 1 wherein said green ceramic body is sintered at temperatures of about 1450° C.

12. A method in accordance with claim 1 wherein said components are used in such amounts that, after sintering to final density, the stoichiometric composition of the B″-alumina so formed is at least 90 weight percent of aluminum oxide, about 9.7 to 9.6 weight percent of sodium oxide, and about 0.7 weight percent lithium oxide.

13. A method for preparing a dense, stabilized B″-alumina containing ceramic body exhibiting a resistivity at 300° C. of between about 5 and about 20 ohm-cm comprising:

(A) forming a green ceramic body from a composition comprising:

(i) a first component comprising a liquid forming composition containing sodium aluminate, magnesium aluminate; and (ii) a second component comprising:
  (a) alpha-alumina powder having a particle size in the range of about 0.3 to about 5 micrometers or
  (b) the reaction products formed by calcining said alpha-alumina powder with sodium carbonate, said components being used in such amounts that, after sintering to final density, the stoichiometric composition of the B″-alumina so formed is from about 8.9 to 9.4 weight percent of sodium oxide, about 0.9 to 1.5 weight percent of lithium oxide, about 0.9 to 4.0 weight percent of magensium oxide and at least 90 weight percent of aluminum oxide; and (B) Sintering said green body at a temperature of about 1440° C. to less than 1550° C. and for a time necessary to achieve the desired final density.

14. A method in accordance with claim 13 wherein said liquid forming composition is a binary mixture consisting of magensium aluminate and sodium aluminate and the compound $Li_2O:5Al_2O_3$ is included in the composition as a source of lithium oxide.

15. A method in accordance with claim 14 wherein said binary mixture is prepared by calcining a mixture of magnesium carbonate, sodium carbonate and alpha-alumina.

16. A method in accordance with claim 13 wherein said liquid forming composition is a ternary mixture consisting of sodium aluminate, magnesium aluminate, and lithium aluminate.

17. A method in accordance with claim 16 wherein said ternary mixture is prepared by calcining a mixture of 0.73 moles of magnesium carbonate, one (1) mole of lithium carbonate and 2.73 moles of dried aluminum oxide at about 1000° C. for about 4 hours.

18. A method in accordance with claim 13 wherein said second component comprises a mixture of sodium aluminate and said alpha-alumina has a particle size in the range of about 0.3 to about 5 micrometers.

* * * * *